(12) United States Patent
Takada et al.

(10) Patent No.: US 12,015,317 B2
(45) Date of Patent: Jun. 18, 2024

(54) STATOR AND MOTOR

(71) Applicant: NIDEC CORPORATION, Kyoto (JP)

(72) Inventors: Hibiki Takada, Kyoto (JP); Tomoya Ueda, Kyoto (JP); Takahiro Hiwa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 271 days.

(21) Appl. No.: 17/764,155

(22) PCT Filed: Sep. 1, 2020

(86) PCT No.: PCT/JP2020/033149
§ 371 (c)(1),
(2) Date: Mar. 25, 2022

(87) PCT Pub. No.: WO2021/065297
PCT Pub. Date: Apr. 8, 2021

(65) Prior Publication Data
US 2022/0344997 A1    Oct. 27, 2022

(30) Foreign Application Priority Data

Sep. 30, 2019   (JP) .................................. 2019-179970

(51) Int. Cl.
*H02K 3/50*         (2006.01)
(52) U.S. Cl.
CPC ........... *H02K 3/50* (2013.01); *H02K 2203/09* (2013.01)
(58) Field of Classification Search
CPC .... B05D 7/577; C09D 133/068; C09D 5/038; C08L 2666/28; A61B 17/1615;
(Continued)

(56) References Cited

U.S. PATENT DOCUMENTS

| 8,881,371 B2 | 11/2014 | Guercioni |
| 2015/0145358 A1* | 5/2015 | Cho .................. H02K 3/522 310/71 |

FOREIGN PATENT DOCUMENTS

| CN | 107492959 A | 12/2017 |
| JP | 201216195 A | 1/2012 |

(Continued)

OTHER PUBLICATIONS

JP-2012016195-A, Etsuno, all pages (Year: 2012).*

(Continued)

*Primary Examiner* — Naishadh N Desai
(74) *Attorney, Agent, or Firm* — HAUPTMAN HAM, LLP

(57) ABSTRACT

A stator includes: a stator core including teeth; pins including a working portion extending in an axial direction in a slot between the teeth; and bus bars electrically connected to the pins. In each slot, the working portions are disposed over stages in a radial direction. The pins include the two working portions across the teeth, first and second pins each including a connection portion connecting the working portion in a circumferential direction, and a third pin connected to the bus bar. The working portion of the second pin is disposed on one of the outermost and innermost stages of the slot, and the working portion of the third pin is disposed on one or the other of the outermost and innermost stages of the slot. A number of teeth straddled by the second pin is larger by two than a number of teeth straddled by the first pin.

11 Claims, 8 Drawing Sheets

(58) Field of Classification Search
CPC ............ A61B 17/1626; A61B 17/1633; A61B 17/320016; A61B 17/32002; A61B 17/320783; A61B 18/082; A61B 18/1206; A61B 18/14; A61B 18/148; A61B 18/1482; A61B 2017/00017; A61B 2017/0023; A61B 2017/0088; A61B 2017/320024; A61B 2017/320028; A61B 2018/00196; A61B 2018/00202; A61B 2018/00208; A61B 2018/00214; A61B 2018/00601; A61B 2018/0091; A61B 2018/00952; A61B 2018/126; A61B 2018/1472; A61B 2018/1475; A61B 2218/007; C09K 15/08; H02K 2203/09; H02K 3/50; H02K 3/12; H02K 3/28; Y02T 10/64

See application file for complete search history.

(56) References Cited

FOREIGN PATENT DOCUMENTS

| | | | | |
|---|---|---|---|---|
| JP | 2012016195 A | * | 1/2012 | |
| JP | 5516989 B2 | | 6/2014 | |
| JP | 201734848 A | | 2/2017 | |
| JP | 2017034848 A | * | 2/2017 | ............... H02K 3/12 |

OTHER PUBLICATIONS

JP-2017034848-A, Tamura, all pages (Year: 2017).*
International Search Report in PCT/JP2020/033149, dated Nov. 24, 2020. 4pp.

* cited by examiner

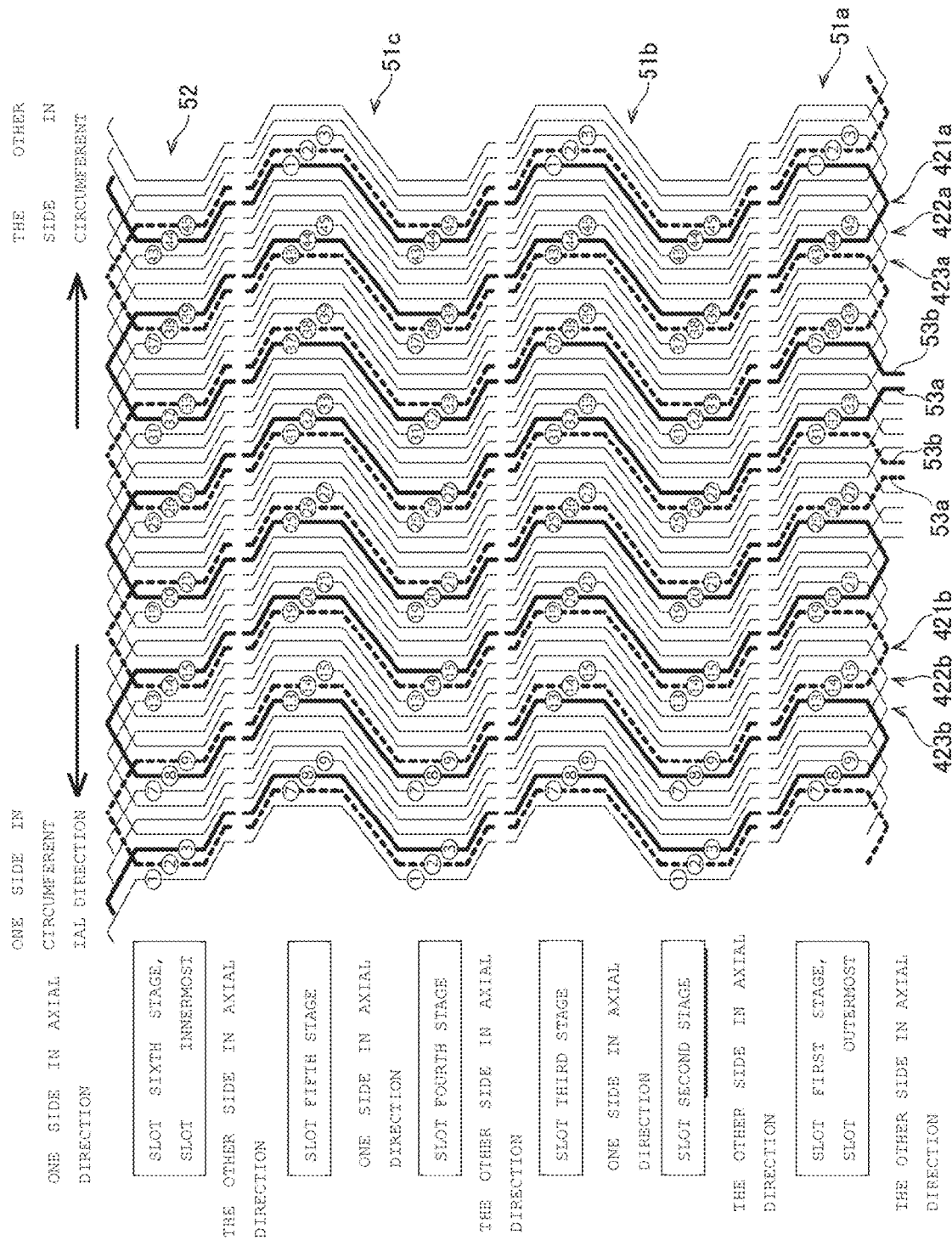

STATOR AND MOTOR

CROSS-REFERENCE TO RELATED APPLICATIONS

This is the U.S. national stage of application No. PCT/JP2020/033149, filed on Sep. 1, 2020, and priority under 35 U.S.C. § 119 (a) and 35 U.S.C. § 365(b) is claimed from Japanese Patent Application No. 2019-179970, filed on Sep. 30, 2019.

FIELD OF THE INVENTION

The present invention relates to a stator used in a motor and the motor. This application is based on Japanese Patent Application No. 2019-179970 filed on Sep. 30, 2019. The present application claims the benefit of priority over the application. The entire contents are incorporated herein by reference.

BACKGROUND

Conventionally, a drive device using a motor as a power source is mounted on a vehicle such as an electric vehicle and a plug-in hybrid vehicle. Sometimes a coil (hereinafter, referred to as a plate coil) formed by bending an elongated plate-shaped conductor plate is used in a large-input power motor such as a traction motor that outputs driving force for traveling of the vehicle. For example, a conventional motor in which such a coil is used is known.

Such a plate coil has a problem in that assembly is difficult when a connection shape between slots becomes complicated as compared with a coil formed by a conductive wire. In particular, in the conventional coil, when the coil is disposed one turn in a circumferential direction and then the coil is disposed next one turn, wiring is required to be made so as to be connected to the next slot by changing a bending angle of the plate coil, and thus the difficulty in manufacturing is high. When coil wiring of fractional pitch winding in which a coil pitch is different from a magnetic pole pitch is performed, the difficulty in manufacturing is high.

SUMMARY

One embodiment of the present invention is a stator used in a motor, the stator including: a stator core including an annular core back centered on a center axis and a plurality of teeth extending from the core back toward a radial inside; a plurality of pins including a conductive working portion extending in an axial direction in a slot between the teeth; and a plurality of bus bars electrically connected to the plurality of pins. In each of the slots, the working portions are disposed over a plurality of stages in a radial direction, the plurality of pins include a first pin including the two working portions disposed across the teeth, a second pin including the two working portions disposed across the teeth, and a third pin that includes the one working portion and is connected to the bus bar, each of the first pin and the second pin includes a crossing portion connecting the two working portions in a circumferential direction on one side in the axial direction, and a connection portion connected to another pin on the other side in the axial direction of the working portion, in the first pin, the two working portions are inserted into an identical stage or stages adjacent to each other in the radial direction, each of the working portions of the second pin is disposed in one of an outermost stage and an innermost stage of the slot, each of the working portions of the third pin is disposed in one or the other of the outermost stage and the innermost stage of the slot, and a number of the teeth straddled by the second pin is larger by two than a number of the teeth straddled by the first pin.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIG. 8 is a schematic view schematically illustrating connection between all pins of a coil portion of the first embodiment.

DETAILED DESCRIPTION

Hereinafter, an exemplary embodiment of the present invention will be described with reference to the drawings. In the following description, a direction parallel to the center axis of a motor is referred to as an "axial direction", a direction orthogonal to the center axis of the motor is referred to as a "radial direction", and a direction extending along an arc about the center axis of the motor is referred to as a "circumferential direction".

Figure 1:
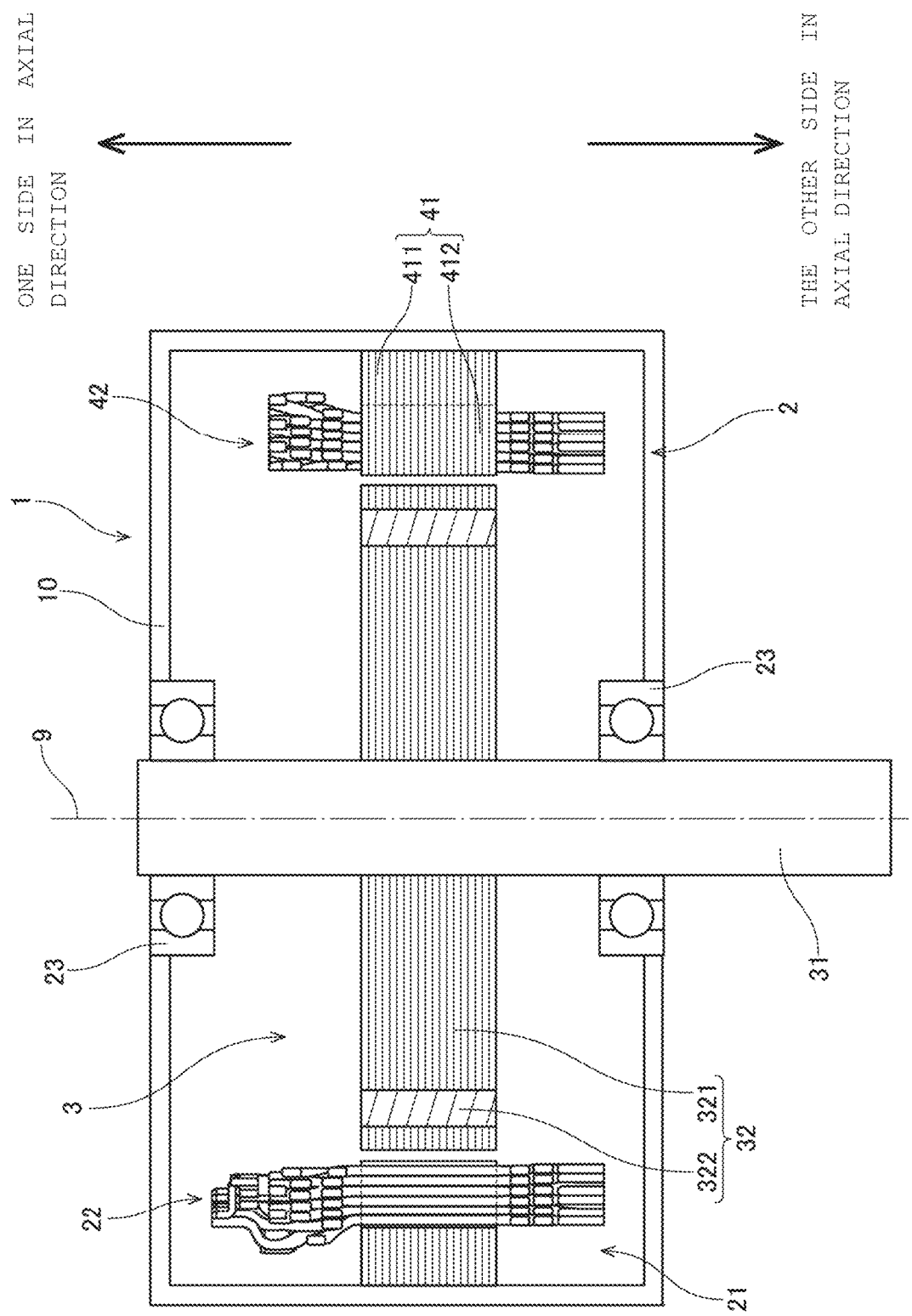
FIG. 1 is a schematic sectional view illustrating a motor according to a first embodiment.
Figure 2:
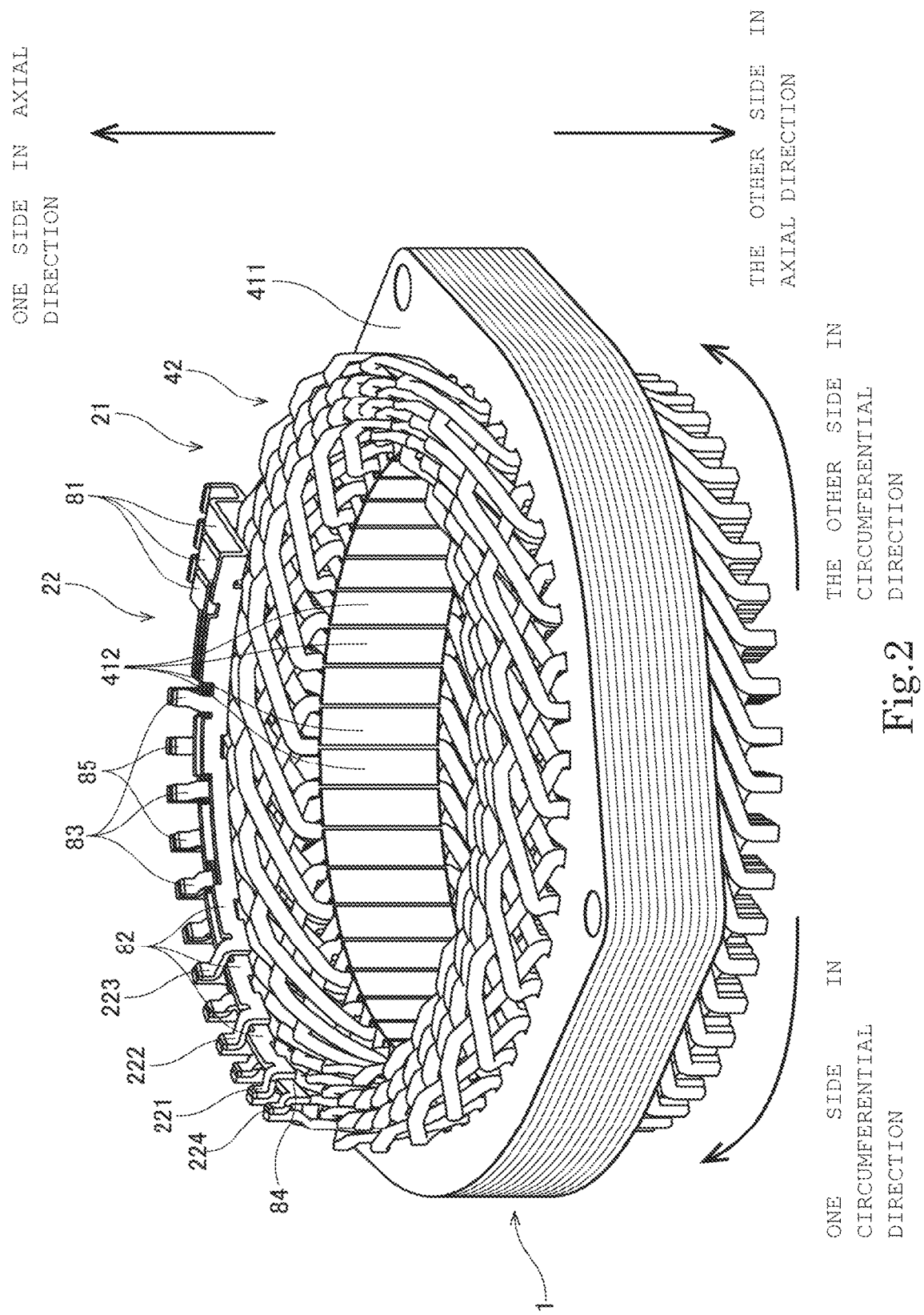
FIG. 2 is a perspective view illustrating a stator and a bus bar of the first embodiment.
Figure 3:
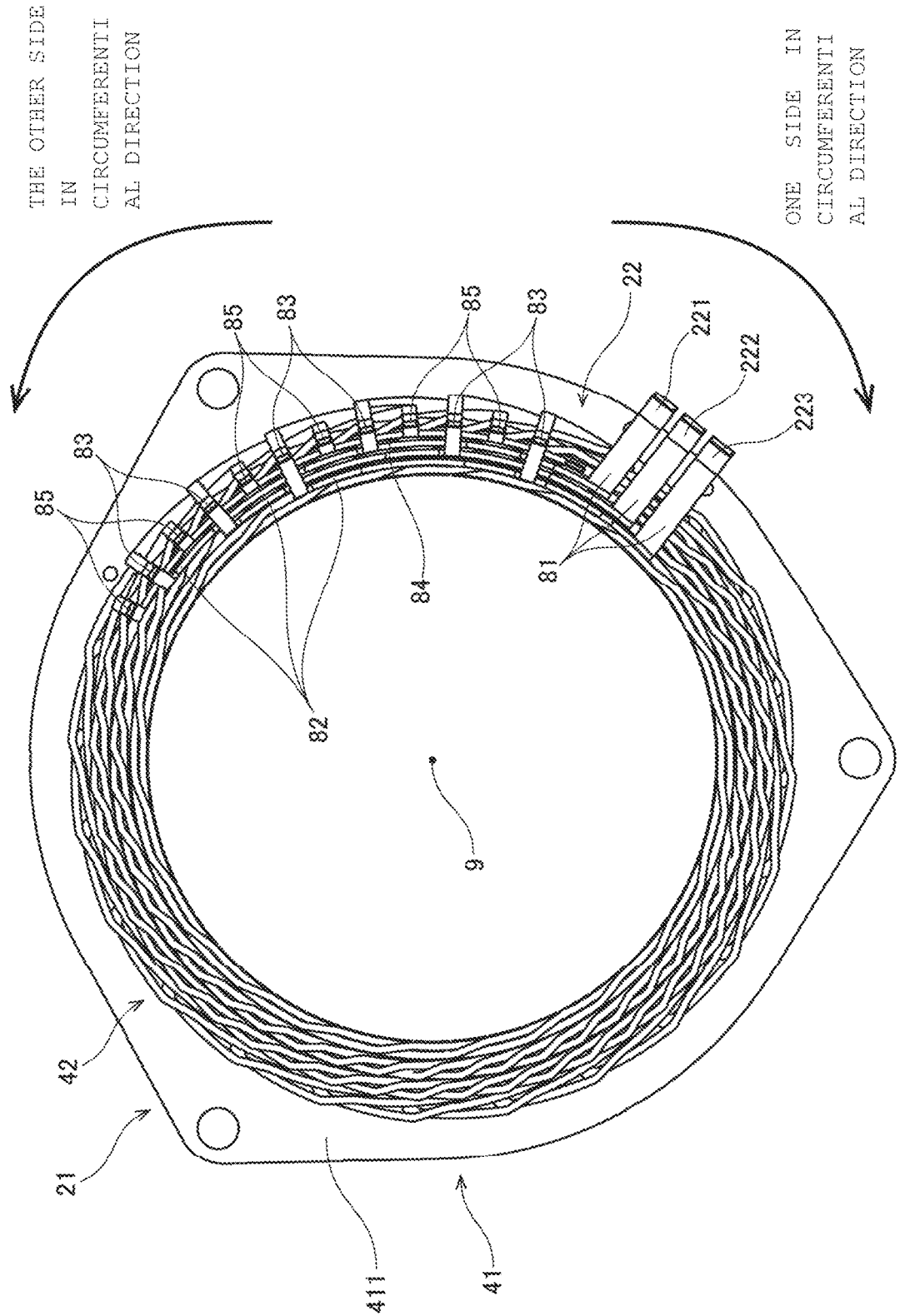
FIG. 3 is a plan view illustrating the stator and the bus bar of the first embodiment when viewed from one side in an axial direction.

FIG. 1 is a schematic sectional view illustrating a motor 1 including a stator 21 according to a first embodiment of the present invention. FIG. 2 is a perspective view of the stator 21 and a bus bar 22. FIG. 3 is a plan view illustrating the stator 21 and the bus bar 22 when viewed from one side in an axial direction.

The motor 1 is a traction motor that is mounted on a vehicle such as an electric vehicle and a plug-in hybrid vehicle and outputs driving force for traveling of the vehicle. However, the motor 1 of the present invention may be a motor for use other than the traction motor. For example, the motor 1 of the present invention may be mounted on an air blowing device, a home electric appliance, a medical instrument, a large-sized industrial facility, and the like to output the driving force.

As illustrated in FIG. 1, the motor 1 includes a motor cover 10, a stationary portion 2, and a rotating portion 3. The motor cover 10 is a housing that accommodates at least parts of the stationary portion 2 and the rotating portion 3. The stationary portion 2 stands still relative to the motor cover 10. The rotating portion 3 is supported so as to be rotatable around a center axis 9 with respect to the stationary portion 2.

As illustrated in FIG. 1, the stationary portion 2 includes the stator 21, the bus bar 22, and two bearings 23. The rotating portion 3 includes a shaft 31 and a rotor 32.

The stator 21 is an armature that generates magnetic flux in accordance with a driving current supplied through the bus bar 22. As illustrated in FIGS. 2 and 3, the stator 21 annularly surrounds the center axis 9. As illustrated in FIGS. 1 to 3, the stator 21 includes a stator core 41, and a coil portion 42.

The stator core 41 is made of a laminated steel sheet in which electromagnetic steel sheets are laminated in the axial direction. The stator core 41 includes an annular core back 411 and a plurality of teeth 412 extending from the core back 411 to the radial inside. An inner periphery of the core back 411 has an annular shape around the center axis 9. The plurality of teeth 412 are arranged at substantially regular intervals in the circumferential direction.

The coil portion 42 is disposed around the teeth 412 through an insulating material such as insulating paper or an insulator. Detailed configuration of the coil portion 42 will be described later.

The bus bar 22 is disposed on one side in the axial direction of the stator 21. The bus bar 22 of the embodiment includes a U-phase bus bar 221, a V-phase bus bar 222, a W-phase bus bar 223, and a neutral point bus bar 224. The bus bar 22 is electrically connected to the coil portion 42.

The U-phase bus bar 221, the V-phase bus bar 222, and the W-phase bus bar 223 include a power supply connection portion 81 extending in the radial direction, a first arcuate portion 82 extending in the circumferential direction, and a pin connection portion 83 extending in the radial direction and the axial direction from the first arcuate portion 82. A radially outer end of the power supply connection portion 81 is directly or indirectly connected to a power supply device (not illustrated). The first arcuate portion 82 extends in the circumferential direction from a radially inner end of the power supply connection portion 81 along the coil portion 42. Each of the two pin connection portions 83 is welded and electrically connected to any one end (hereinafter referred to as "one coil end") of the coil 421, 422, 423 of the later-described coil portion 42.

The neutral point bus bar 224 includes a second arcuate portion 84 extending in the circumferential direction and six neutral point connection portions 85 extending in the radial direction and the axial direction from the second arcuate portion 84. The second arcuate portion 84 electrically connects the six neutral point connection portions 85. Each of the six neutral point connection portions 85 is welded and electrically connected to the other end (hereinafter referred to as "the other end of coil") of any one of the coils 421, 422, 423 of the coil portion 42.

In the embodiment, three-phase AC power is input to the coil portion 42 through the bus bar 22. The coil portion 42 includes a U-phase coil 421, a V-phase coil 422, and a W-phase coil 423 to which three-phase driving currents having different phases are input. In the coil portion 42 of the embodiment, each of the phase coils 421, 422, 423 includes two coils connected in parallel. Hereinafter, the two coils included in the U-phase coil 421 are referred to as a first U-phase coil 421a and a second U-phase coil 421b, the two coils included in the V-phase coil 422 are referred to as a first V-phase coil 422a and a second V-phase coil 422b, and the two coils included in the W-phase coil 423 are referred to as a first W-phase coil 423a and a second W-phase coil 423b.

Currents having phases different from each other by ⅓ wavelength are supplied to the U-phase bus bar 221, the V-phase bus bar 222, and the W-phase bus bar 223. Each of the two pin connection portions 83 of the U-phase bus bar 221 is connected to one coil end (a first connection portion of a later-described double-sided opening third pin 53a) of each of the first U-phase coil 421a and the second U-phase coil 421b. The two pin connection portions 83 of the V-phase bus bar 222 are connected to one coil ends of the first V-phase coil 422a and the second V-phase coil 422b. The two pin connection portions 83 of the W-phase bus bar 223 are connected to one coil ends of the first W-phase coil 423a and the second W-phase coil 423b.

Each of the six neutral point connection portions 85 of the neutral point bus bar 224 is connected to the other end of coil (first connection portion of the later-described offset third pin 53b) of each of the first U-phase coil 421a, the second U-phase coil 421b, the first V-phase coil 422a, the second V-phase coil 422b, the first W-phase coil 423a, and the second W-phase coil 423b. In this manner, the U-phase coil 421, the V-phase coil 422, and the W-phase coil 423 of the embodiment are connected in parallel by star-connection.

Thus, when the driving current is supplied to each of the U-phase bus bar 221, the V-phase bus bar 222, and the W-phase bus bar 223, the currents having the phases different from each other by ⅓ wavelength flow through the U-phase coil 421, the V-phase coil 422, and the W-phase coil 423.

Each of the first arcuate portions 82 of the U-phase bus bar 221, the V-phase bus bar 222, and the W-phase bus bar 223 and the second arcuate portion 84 of the neutral point bus bar 224 is disposed radially inside the welded portion between each of the phase coils 421, 422, 423 and the bus bars 221, 222, 223, 224.

The two bearings 23 is a mechanism that rotatably supports the shaft 31 with respect to the motor cover 10. As illustrated in FIG. 1, one of the two bearings 23 is disposed on one side in the axial direction of the stator 21. The other of the two bearings 23 is disposed on the other side in the axial direction of the stator 21. For example, a ball bearing in which spherical rolling elements are interposed between an outer ring fixed to the motor cover 10 and an inner ring rotating together with the shaft 31 is used as the bearing 23.

The shaft 31 is a columnar member disposed along the center axis 9. The shaft 31 rotates about the center axis 9 while being supported by the two bearings 23. The end on the other side in the axial direction of the shaft 31 protrudes to the other side in the axial direction from the motor cover 10, and outputs rotational driving force.

The rotor 32 is fixed to the shaft 31, and rotates together with the shaft 31. The rotor 32 of the embodiment is what is called an IPM type rotor in which a magnet 322 is inserted in a rotor core 321 made of a laminated steel plate in which electromagnetic steel plates are laminated in the axial direction. An N-pole magnetic field and an S-pole magnetic field are alternately formed in the circumferential direction on the outer circumferential surface of the rotor 32 by the magnet inserted in the rotor 32. The outer circumferential surface of the rotor 32 is radially opposite to an end face of the radial inside of the teeth 412 with a slight gap interposed therebetween. That is, the rotor 32 includes a magnetic pole surface opposite to the stator 21 in the radial direction.

For example, the rotor 32 may be what is called an SPM type rotor in which a plurality of magnets are fixed to the outer circumferential surface of a cylindrical rotor core that is a magnetic body, or a magnet resin rotor that is formed in a substantially cylindrical shape and has the outer circumferential surface alternately magnetized to the N pole and the S pole in the circumferential direction.

When the motor 1 is driven, the driving current is supplied from a driving circuit of the motor 1 to the coil portion 42 through the bus bar 22. Thus, the magnetic flux is generated in each of the plurality of teeth 412 of the stator core 41. Furthermore, torque is generated in the circumferential direction by the action of the magnetic flux between the teeth 412 and the rotor 32. As a result, the rotating portion 3 rotates about the center axis 9. In this manner, the rotational driving force is output to a driving target connected to the end on the other side in the axial direction of the shaft 31.

Figure 4:
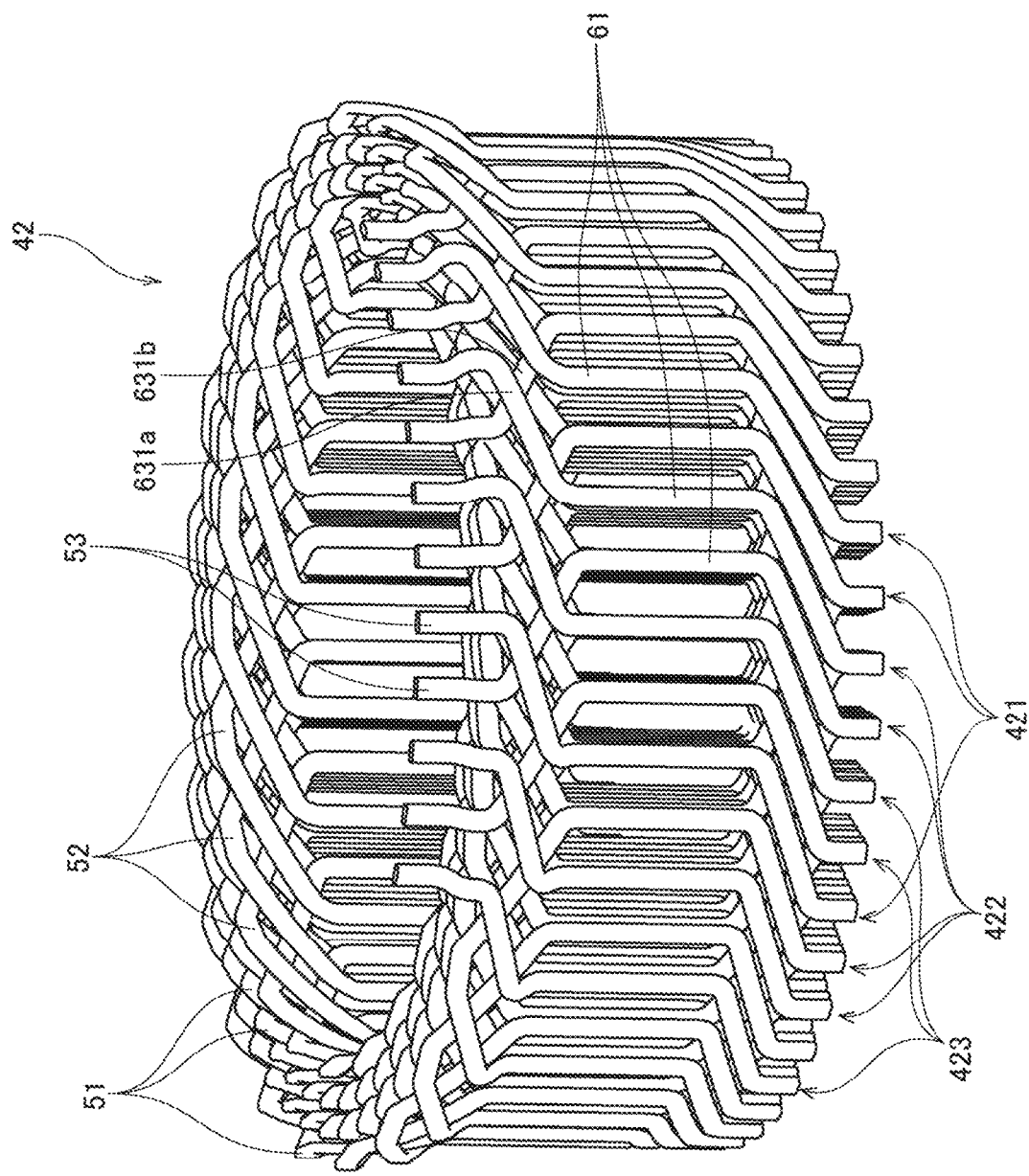
FIG. 4 is a perspective view illustrating a coil of the first embodiment.
Figure 5:
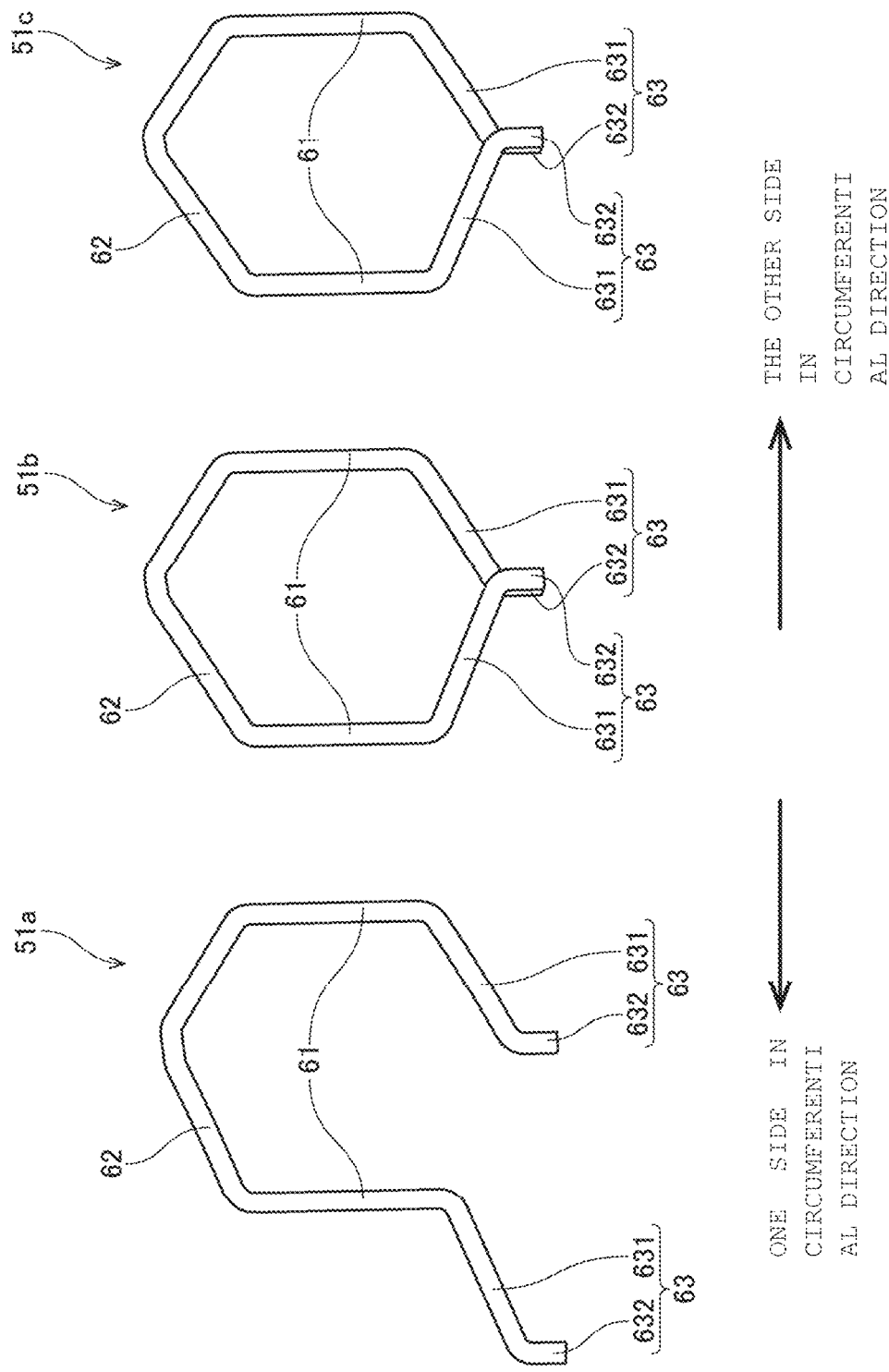
FIG. 5 is a perspective view illustrating an offset first pin, an inside centering first pin, and an outside centering first pin of the embodiment.
Figure 6:
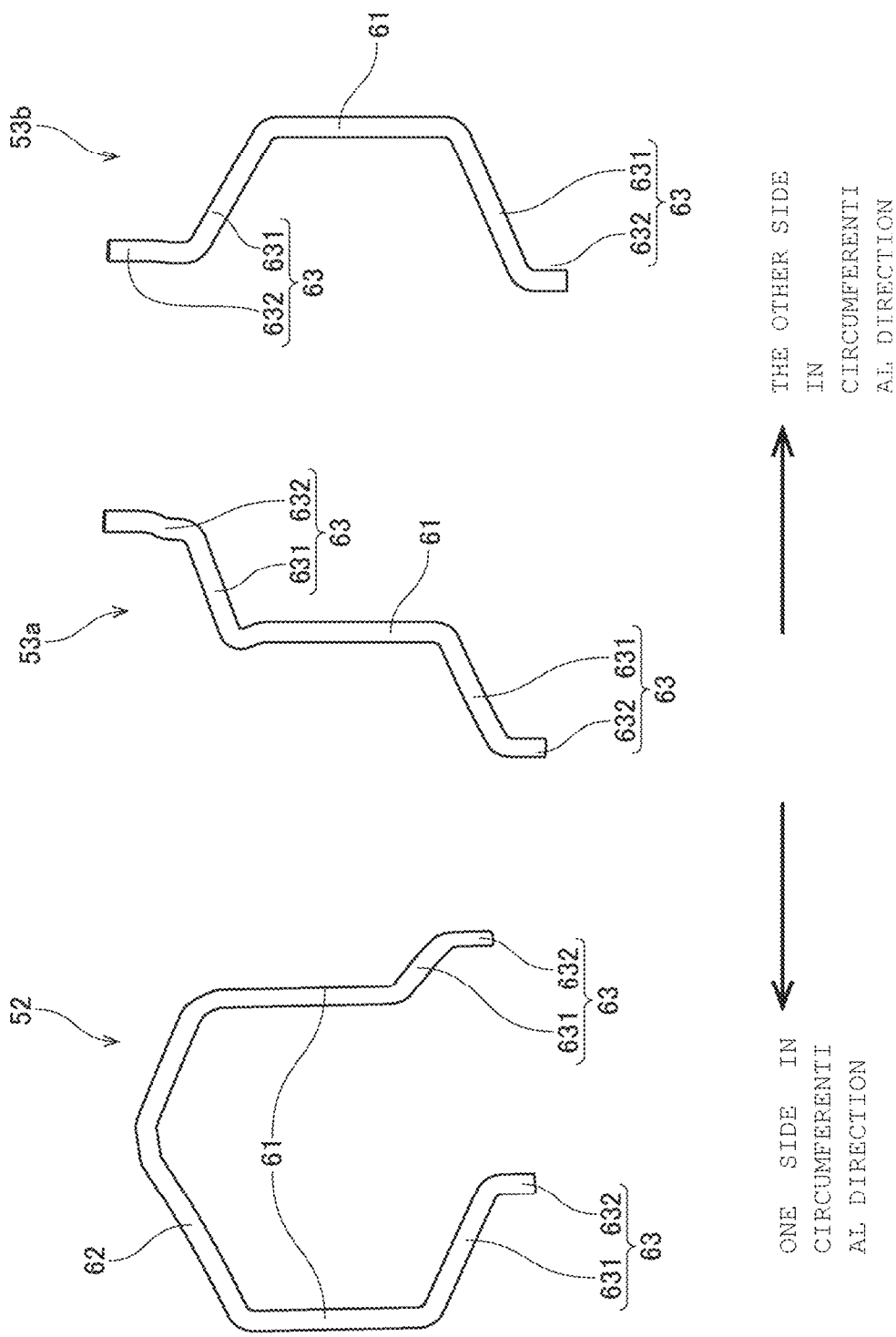
FIG. 6 is a perspective view illustrating a second pin, a double-sided opening third pin, and an offset third pin of the first embodiment.

With reference to FIGS. 4 to 6, the configuration of the coil portion 42 will be described below. FIG. 4 is a perspective view of the coil portion 42. FIG. 5 is a perspective view illustrating an offset first pin 51*a*, an outside centering first pin 51*b*, and an inside centering first pin 51*c* that are specific aspects of a first pin 51. FIG. 6 is a perspective view illustrating a second pin 52 and the double-sided opening third pin 53*a* and the offset third pin 53*b* that are specific aspects of a third pin 53. FIGS. 5 and 6 are views illustrating the pins 51*a*, 51*b*, 51*c*, 52, 53*a*, 53*b* when viewed from a circumferential outside.

As illustrated in FIG. 4, the coil portion 42 includes a plurality of first pins 51, a plurality of second pins 52, and a plurality of third pins 53. Each of a pluralities of pins 51, 52, 53 is formed by bending an elongated plate-shaped conductive material.

The first pin 51 is a generic name of the offset first pin 51*a*, the outside centering first pin 51*b*, and the inside centering first pin 51*c* in FIG. 5. As illustrated in FIG. 5, the first pin 51 includes two working portions 61, a crossing portion 62, and two connection portions 63. The two working portions 61 of the first pin 51 are disposed across the five teeth 412.

As illustrated in FIG. 6, the second pin 52 includes two working portions 61, the crossing portion 62, and two connection portions 63. The two working portions 61 of the second pin 52 are disposed across the seven teeth 412. That is, the number of teeth 412 straddled by the two working portions 61 of the second pin 52 is larger by two than the number of teeth 412 straddled by the two working portions 61 of the first pin 51.

The third pin 53 is a generic term for the double-sided opening third pin 53*a* and the offset third pin 53*b* in FIG. 6. As illustrated in FIG. 6, the third pin 53 includes one working portion 61 and two connection portions 63.

The working portion 61 is a region extending in the axial direction in a slot formed between the adjacent teeth 412. In each of the first pin 51 and the second pin 52, the crossing portion 62 circumferentially connects the two working portions 61 on one side in the axial direction. The number of teeth 412 straddled by the crossing portion 62 in the first pin 51 is five, and the number of teeth 412 straddled by the crossing portion 62 in the second pin 52 is seven.

Each of the connection portions 63 is welded to one of other pins 51, 52, 53 or the bus bars 221 to 224 of the bus bar 22. The connection portion 63 includes an inclination portion 631 extending obliquely with respect to the axial direction from an end in the axial direction of the working portion 61 and a welded end 632 extending in the axial direction from a tip of the inclination portion 631. The two connection portions 63 including the first pin 51 and the second pin 52 are disposed on the other side in the axial direction of the working portion 61. One of the two connection portions 63 included in the third pin 53 is disposed on the other side in the axial direction of the working portion 61, and the other is disposed on one side in the axial direction of the working portion 61.

As illustrated in FIG. 5, in the offset first pin 51*a*, each of the two inclination portion 631 extends in the other side in the circumferential direction from the working portion 61 toward the welded end 632. In the offset first pin 51*a*, each of the two welded ends 632 is disposed at a position shifted by 2.5 slots to the other side in the circumferential direction with respect to the working portion 61 connected through the inclination portion 631.

The outside centering first pin 51*b* and the inside centering first pin 51*c* have a similar shape, and are disposed at different radial positions. For this reason, a circumferential interval between the two working portions 61 of the outside centering first pin 51*b* and a circumferential interval between the two working portions 61 of the inside centering first pin 51*c* are different from each other.

In the outside centering first pin 51*b* and the inside centering first pin 51*c*, the two welded ends 632 are disposed at the center between the two working portions 61 in the circumferential direction. For this reason, in the outside centering first pin 51*b* and the inside centering first pin 51*c*, each of the two inclination portions 631 extends from the working portion 61 toward the welded end 632 disposed at the center in the circumferential direction. Specifically, the welded end 632 connected to the working portion 61 on one side in the circumferential direction is disposed at a position shifted by 2.5 slots to the other side in the circumferential direction with respect to the connected working portion 61.

On the other hand, the welded end 632 connected to the working portion 61 on the other side in the circumferential direction is disposed at a position shifted to one side in the circumferential direction by 2.5 slots with respect to the connected working portion 61. As a result, in the two welded ends 632 included in the outside centering first pin 51*b* and the inside centering first pin 51*c*, the positions in the circumferential direction are matched with each other. Because the two working portions 61 and the connection portion 63 have different radial positions in the outside centering first pin 51*b* and the inside centering first pin 51*c*, the two welded ends 632 also have different radial positions.

As illustrated in FIG. 6, in the second pin 52, each of the two inclination portions 631 extends in one side in the circumferential direction from the working portion 61 toward the welded end 632. In the second pin 52, each of the two welded ends 632 is disposed at a position shifted to one side in the circumferential direction with respect to the working portion 61 connected through the inclination portion 631.

The third pin 53 has a first connection portion 63 electrically connected to the bus bar 22 on one side in the axial direction and a second connection portion 63 electrically connected to the other pin 51 on the other side in the axial direction.

In the connection portion 63 on one side in the axial direction of the double-sided opening third pin 53*a*, the inclination portion 631 extends in the other side in the circumferential direction from the end on one side in the axial direction of the working portion 61 toward the welded end 632. The welded end 632 on one side in the axial direction is disposed at a position shifted by 2.5 slots to the other side in the circumferential direction with respect to the working portion 61. In the connection portion 63 on the other side in the axial direction of the double-sided opening third pin 53*a*, the inclination portion 631 extends in one side in the circumferential direction from the end on the other side in the axial direction of the working portion 61 toward the welded end 632. The welded end 632 on the other side in the axial direction is disposed at a position shifted to one side in the circumferential direction with respect to the working portion 61.

In each of the two connection portions 63 of the offset third pin 53b, the inclination portion 631 extends in one side in the circumferential direction from the end of the working portion 61 toward the welded end 632. Each of the welded end 632 on the other side in the axial direction and the welded end 632 on one side in the axial direction is disposed at a position shifted to one side in the circumferential direction with respect to the working portion 61. The welded end 632 on the other side in the axial direction is disposed at a position shifted by 2.5 slots to one side in the circumferential direction with respect to the working portion 61.

The coil portion 42 includes the plurality of pins 51, 52, 53. In addition, the coil portion 42 includes the U-phase coil 421, the V-phase coil 422, and the W-phase coil 423 having the same shape. The V-phase coil 422 is disposed at a position rotated to one side in the 4-slot circumferential direction from the U-phase coil 421. The W-phase coil 423 is disposed at a position rotated by 2 slots to one side in the circumferential direction from the U-phase coil 421.

The plurality of pins 51, 52 configuring the first U-phase coil 421a are connected in series between the third pin 53 connected to the U-phase bus bar 221 and the third pin 53 connected to the neutral point bus bar 224. The plurality of pins 51, 52 configuring the second U-phase coil 421b are connected in series between the third pin 53 connected to the U-phase bus bar 221 and the third pin 53 connected to the neutral point bus bar 224. For this reason, the first U-phase coil 421a and the second U-phase coil 421b are connected in parallel.

The plurality of pins 51, 52 configuring the first V-phase coil 422a are connected in series between the third pin 53 connected to the V-phase bus bar 222 and the third pin 53 connected to the neutral point bus bar 224. The plurality of pins 51, 52 configuring the second V-phase coil 422b are connected in series between the third pin 53 connected to the V-phase bus bar 222 and the third pin 53 connected to the neutral point bus bar 224. For this reason, the first V-phase coil 422a and the second V-phase coil 422b are connected in parallel.

The plurality of pins 51, 52 configuring the first W-phase coil 423a are connected in series between the third pin 53 connected to the W-phase bus bar 223 and the third pin 53 connected to the neutral point bus bar 224. The plurality of pins 51, 52 configuring the second W-phase coil 423b are connected in series between the third pin 53 connected to the W-phase bus bar 223 and the third pin 53 connected to the neutral point bus bar 224. For this reason, the first W-phase coil 423a and the second W-phase coil 423b are connected in parallel.

Figure 7:
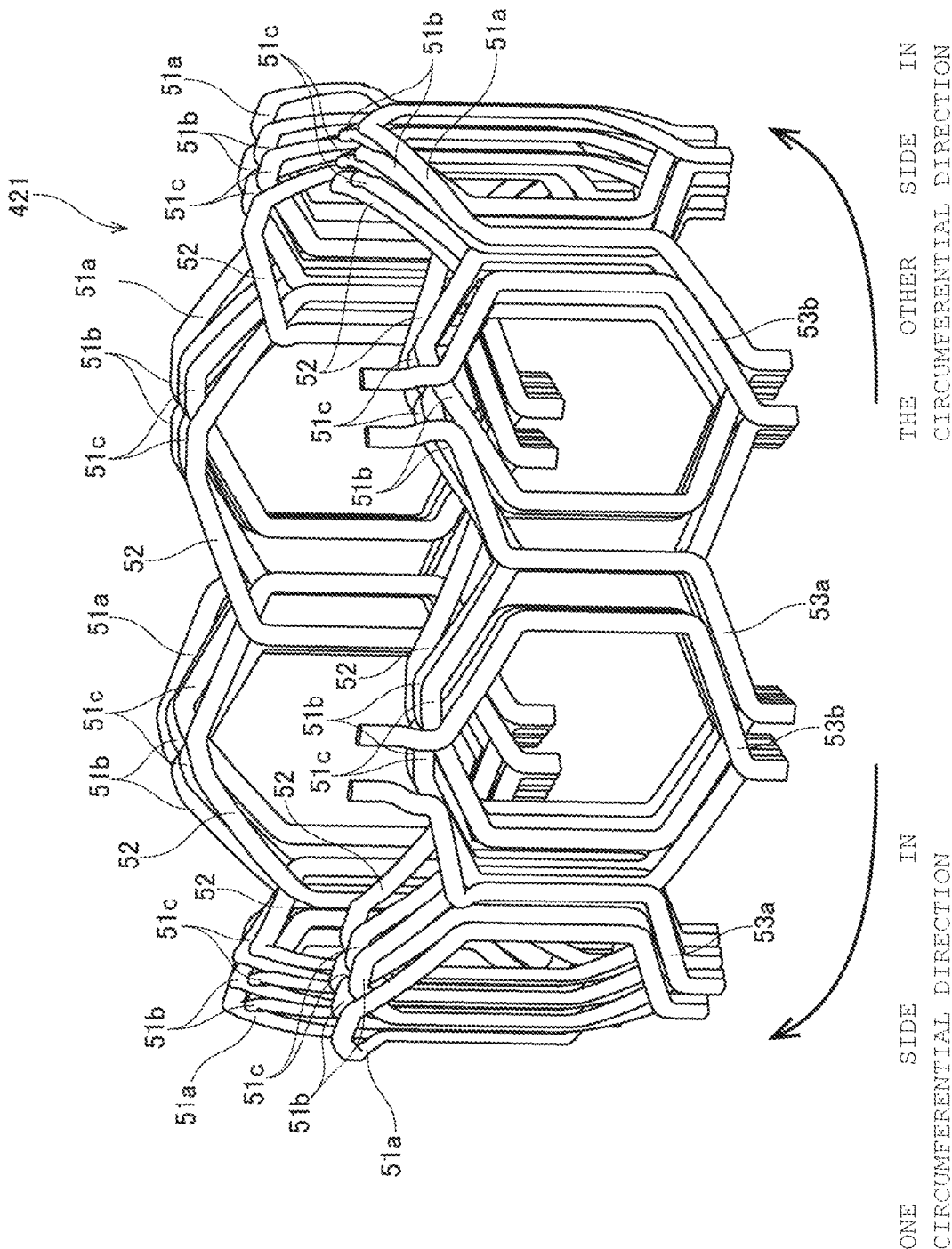
FIG. 7 is a perspective view illustrating a U-phase coil of the first embodiment.

In order to implement such a configuration with a simple configuration, the pins 51, 52, 53 described below are arranged. FIG. 7 is a perspective view illustrating only the U-phase coil 421 of the coil portion 42. As described above, the V-phase coil 422 and the W-phase coil 423 have the same configuration as the U-phase coil 421. FIG. 8 is a schematic view illustrating connection of all the pins 51, 52, 53 of the coil portion 42.

As illustrated in FIGS. 1, 2, 4, and 7, a plurality of working portions 61 are arranged side by side in the radial direction in one slot. In the embodiment, six working portions 61 are arranged in one slot. Hereinafter, the working portion 61 disposed on the outermost side in the radial direction in one slot is referred to as a first stage (outermost stage), the working portion 61 adjacent to the radial inside of the first stage is referred to as a second stage, the working portion 61 adjacent to the radial inside of the second stage is referred to as a third stage, the working portion 61 adjacent to the radial inside of the third stage is referred to as a fourth stage, the working portion 61 adjacent to the radial inside of the fourth stage is referred to as a fifth stage, and the working portion 61 disposed on the innermost side in the radial direction is referred to as a sixth stage (innermost stage).

In FIG. 8, the pins 51, 52, 53 belonging to the first U-phase coil 421a are indicated by thick solid lines. The pins 51, 52, 53 belonging to the second U-phase coil 421b are indicated by thick broken lines. In FIG. 8, a slot number is assigned to the working portion 61 belonging to the U-phase coil 421. Slot Nos. 1, 2, and 3 are assigned to one set of three slots in which the working portions 61 of the U-phase coil 421 are continuously arranged. The slot number increases from one side to the other side in the circumferential direction. In the embodiment, each of the numbers of teeth 412 and slots is 48. For this reason, the slot No. 1 is adjacent to the other side in the circumferential direction of the slot No. 48.

In the coil portion 42, fractional pitch winding in which a coil pitch is shorter than a magnetic pole pitch is adopted. By adopting the fractional pitch winding, although the magnitude of the induced electromotive force is slightly inferior to that of the entire node winding in which the coil pitch is matched with the magnetic pole pitch, the waveform of the induced electromotive force can be significantly approximated to a sine wave.

For this reason, only the working portion 61 belonging to the U-phase coil 421 is disposed in the slot at the center in the circumferential direction among the continuous three slots in which the working portion 61 belonging to the U-phase coil 421 is disposed. In the remaining two slots of the three slots, the working portions 61 belonging to the U-phase coil 421 and the working portions 61 belonging to either the V-phase coil 422 or the W-phase coil 423 are alternately disposed in the radial direction.

Hereinafter, the slot in which only one type of the working portion 61 electrically connected to the U-phase bus bar 221, the working portion 61 electrically connected to the V-phase bus bar 222, and the working portion 61 electrically connected to the W-phase bus bar 223 is disposed is referred to as a single-phase slot. Furthermore, a slot in which any two types of the working portion 61 electrically connected to the U-phase bus bar 221, the working portion 61 electrically connected to the V-phase bus bar, and the working portion 61 electrically connected to the W-phase bus bar 223 are disposed is referred to as a multi-phase slot.

Specifically, the slot in which only the working portion 61 of the U-phase coil 421 is disposed is referred to as a U-phase single-phase slot, the slot in which only the working portion 61 of the V-phase coil 422 is disposed is referred to as a V-phase single-phase slot, and the slot in which only the working portion 61 of the W-phase coil 423 is disposed is referred to as a W-phase single-phase slot. In addition, the slot in which the working portion 61 belonging to the U-phase coil 421 and the working portion 61 belonging to the V-phase coil 422 are disposed is referred to as a U-phase V-phase multi-phase slot, the slot in which the working portion 61 belonging to the V-phase coil 422 and the working portion 61 belonging to the W-phase coil 423 are disposed is referred to as a V-phase W-phase multi-phase slot, and the slot in which the working portion 61 belonging to the W-phase coil 423 and the working portion 61 belonging to the U-phase coil 421 are disposed is referred to as a W-phase U-phase multi-phase slot.

From one side to the other side in the circumferential direction, six slot formations of the U-phase single-phase slot, the U-phase V-phase multi-phase slot, the V-phase single-phase slot, the V-phase W-phase multi-phase slot, the W-phase single-phase slot, and the W-phase U-phase multi-phase slot are repeatedly disposed. That is, the single-phase slot and the multi-phase slot are alternately disposed in the circumferential direction. In FIG. 8, slots of Nos. 2, 8, 14, 26, 32, 38, and 44 are the U-phase single-phase slots. That is, each three slots through which the U-phase current flows are disposed at eight places in the circumferential direction. For this reason, the number of poles of the stator 21 is eight.

In this manner, the interval between the in-phase single-phase slots is disposed every six slots, and this becomes the magnetic pole pitch. Hereinafter, the number of slots matched with the magnetic pole pitch is referred to as a reference slot number. In the embodiment, the reference slot number is six.

As illustrated in FIG. 8, the second pin 52 is disposed on the sixth stage that is the innermost stage of the slot such that the crossing portion 62 is on one side in the axial direction. In the second pin 52, both of the two working portions 61 are disposed in the sixth stage. The working portion 61 on one side in the circumferential direction of the second pin 52 is adjacent to one side in the circumferential direction of the working portion 61 on the other side in the circumferential direction of the in-phase second pin 52 adjacent to one side in the circumferential direction. Similarly, the working portion 61 on the other circumferential direction side of the second pin 52 is adjacent to the other side in the circumferential direction of the working portion 61 on one circumferential direction side of the in-phase second pin 52 adjacent to the other side in the circumferential direction. For this reason, positions of the crossing portion 62 of each of the second pins 52 and the crossing portion 62 of the second pin 52 adjacent to the circumferential direction overlap each other by one slot in the circumferential position.

The inside centering first pin 51c is disposed in the fifth stage to the fourth stage of the slot. In the inside centering first pins 51c disposed in the fifth stage and the fourth stage, the working portion 61 on the other side in the circumferential direction is disposed in the fifth stage, and the working portion 61 on one side in the circumferential direction is disposed in the fourth stage. Each of the welded ends 632 of the connection portions 63 extending from the two working portions 61 of the second pin 52 disposed in the sixth stage is welded to the welded end 632 of the connection portion 63 extending from the working portion 61 of the inside centering first pin 51c disposed in the fifth stage. The two working portions 61 of the second pins 52 disposed in the sixth stage are connected to different inside centering first pins 51c.

The outside centering first pin 51b is disposed in the third stage to the second stage of the slot. In the outside centering first pins 51b disposed in the third stage and the second stage, the working portion 61 on the other side in the circumferential direction is disposed in the third stage, and the working portion 61 on one side in the circumferential direction is disposed in the second stage. Each of the welded ends 632 of the connection portions 63 extending from the working portions 61 of the inside centering first pins 51c disposed in the fourth stage is welded to the welded end 632 of the connection portion 63 extending from the working portion 61 of the outside centering first pin 51b disposed in the third stage.

The offset first pins 51a is disposed on the first stage that is the outermost stage of the slot except for predetermined four slots (Nos. 26, 31, 32, and 37 in the example of FIG. 8). The predetermined four slots are referred to as irregular disposition slots. In the irregular disposition slot, two double-sided opening third pins 53a and the two offset third pins 53b are disposed instead of the two offset first pins 51a adjacent to each other.

Except for the irregular disposition slot, the working portion 61 on one side in the circumferential direction of the offset first pin 51a is adjacent to the other side in the circumferential direction of the working portion 61 on the other side in the circumferential direction of the in-phase offset first pin 51a adjacent to one side in the circumferential direction. The working portion 61 on the other side in the circumferential direction of the offset first pin 51a is adjacent to one side in the circumferential direction of the working portion 61 on one side in the circumferential direction of the in-phase offset first pin 51a adjacent to the other side in the circumferential direction.

The four slots of the irregular disposition slot include two sets of slots including the slot in which the double-sided opening third pin 53a is disposed and the slot in which the offset third pin 53b is disposed that are adjacent to each other with the four slots including the V-phase single-phase slot and the W-phase single-phase slot interposed therebetween. In the two slots, the working portion 61 of the double-sided opening third pin 53a is disposed on one side (Nos. 26 and 32 in FIG. 8) in the circumferential direction. In the two slots, the working portion 61 of the offset third pin 53b is disposed on the other side (Nos. 31 and 37 in FIG. 8) in the circumferential direction.

Each of the welded ends 632 of the connection portions 63 extending from the two working portions 61 of the offset first pin 51a disposed in the first stage is welded to the welded ends 632 of the connection portions 63 extending from the working portions 61 of the outside centering first pin 51b disposed in the second stage. The two working portions 61 of the offset first pin 51a disposed in the first stage are connected to different outside centering first pins 51b.

Each of the welded ends 632 of the connection portions 63 extending to the other side in the axial direction from the working portions 61 of the two double-sided opening third pin 53a and the two offset third pin 53b that are disposed in the first stage is welded to the welded ends 632 of the connection portions 63 extending from the working portions 61 of the outside centering first pin 51b disposed in the second stage.

Each of the welded ends 632 of the connection portions 63 extending to one side in the axial direction of the two double-sided opening third pins 53a disposed in the first stage is welded to two of the neutral point connection portions 85 of the neutral point bus bar 224. That is, the welded end 632 on one side in the axial direction of the double-sided opening third pin 53a serves as a neutral point bus bar connection portion of the first U-phase coil 421a and the second U-phase coil 421b.

The welded ends 632 of the connection portions 63 extending to one side in the axial direction of the two offset third pins 53b disposed in the first stage are welded to the two pin connection portions 83 of the U-phase bus bar 221. That is, the welded end 632 on one side in the axial direction of the offset third pin 53b serves as a phase bus bar connection portion of the first U-phase coil 421a and the second U-phase coil 421b.

As described above, the connection portion 63 on one side in the axial direction of the double-sided opening third pin 53a and the offset third pin 53b is the first connection portion electrically connected to the bus bar 22 on one side in the axial direction of the working portion 61. The connection portion 63 on the other side in the axial direction of the double-sided opening third pin 53a and the offset third pin 53b is the second connection portion welded to the other pin 51 on the other side in the axial direction of the working portion 61.

As illustrated in FIG. 8, the plurality of pins 51, 52 are connected in series between third pin 53 of No. 37 and third pin 53 of No. 32 as indicated by a thick solid line. The pins 51, 52, 53 configure the first U-phase coil 421a. The plurality of pins 51, 52 are connected in series between third pin 53 of No. 31 and third pin 53 of No. 26 as indicated by a thick broken line. The pins 51, 52, 53 configure the second U-phase coil 421b.

In each stage, the working portions 61 belonging to the U-phase coil 421 are disposed every six slots by consecutive two slots. There are eight sets of continuous two slots of the U phase in total, and a set in which the working portion 61 belonging to the first U-phase coil 421a and the working portion 61 belonging to the second U-phase coil 421b are disposed in this order from one side to the other side in the circumferential direction, and a set in which the working portion 61 belonging to the second U-phase coil 421b and the working portion 61 belonging to the first U-phase coil 421a are disposed in this order from one side to the other side in the circumferential direction are alternately disposed.

The circumferential positional relationship between the working portion 61 belonging to the first U-phase coil 421a and the working portion 61 belonging to the second U-phase coil 421b is switched when the working portions go to a pair adjacent to each other in the circumferential direction in the sixth stage that is the innermost stage.

In this manner, the fact that the two working portions 61 disposed at positions close to each other in the circumferential direction in the adjacent sets are the working portions 61 connected in series with each other is implemented by the fact that the number of teeth 412 straddled by the two working portions 61 included in the first pin 51 is smaller by one than the number (reference slot number) obtained by dividing the number of teeth 412 by the number of poles of the stator 21. The fact that the disposition of the two working portions 61 of the adjacent pairs is reversed is implemented by the fact that the number of teeth 412 straddled by the two working portions 61 included in the second pin 52 is larger by one than the reference slot number. Thus, the number of teeth 412 straddled by the two working portions 61 of the second pin 52 is larger by two than the number of teeth 412 straddled by the two working portions 61 of the first pin 51.

With such a configuration, the pins 51, 52, and 53 can be efficiently arranged even when the coil wiring of the fractional pitch winding is performed. In addition, all the welded ends 632 on the other side in the axial direction of all the pins 51, 52, 53 can be disposed at positions shifted in the circumferential direction by the same number of slots from the working portion 61 connected through the inclination portion 631. That is, the angles of all the inclination portions 631 with respect to the working portions 61 can be made substantially uniform.

At the time of manufacturing the coil portion 42, the working portion 61 is disposed in the slot of the stator core 41 while the connection portion 63 is linearly and continuously disposed to the working portion 61. Then, the connection portion 63 is bent using a tool to dispose obliquely the inclination portion 631 with respect to the working portion 61. As described above, when the angles of all the inclination portions 631 with respect to the working portions 61 are made uniform, a single type of tool bending the connection portion 63 can be provided at the time of manufacturing the coil portion 42. In addition, when the angles of all the inclination portions 631 with respect to the working portions 61 are made uniform, the manufacturing process can be simplified as compared with the case where there are a plurality of types of bending angles by the pins 51, 52, 53. Accordingly, ease of manufacturing the coil portion 42 that is a plate coil can be improved.

Furthermore, the number of slots straddling the first pin is reduced by one from the reference slot number and the number of slots straddling the second pin is increased by one from the reference slot number, so that the ease of manufacturing the coil portion 42 can be improved even when the coil wiring of the fractional pitch winding in which the coil pitch is different from the magnetic pole pitch is performed.

As described above, in the double-sided opening third pin 53a, the inclination portion 631 on one side in the axial direction connects the welded end 632 on one side in the axial direction, which is the neutral point bus bar connection portion, and the working portion. In the offset third pin 53b, the inclination portion 631 on one side in the axial direction connects the welded end 632 on one side in the axial direction, which is the phase bus bar connection portion, and the working portion 61. At this point, the inclination portion 631 on one side in the axial direction of the double-sided opening third pin 53a is referred to as a first inclination portion 631a, and the inclination portion 631 on one side in the axial direction of the offset third pin 53b is referred to as a second inclination portion 631b.

As illustrated in FIGS. 4 and 8, a part of the plurality of first inclination portions 631a and a part of the plurality of second inclination portions 631b intersect each other. For example, in FIG. 8, the first inclination portions 631a of the double-sided opening third pins 53a in which the working portions 61 are disposed at Nos. 24, 26, 28, 30, and 32 intersect the second inclination portions 631b of the offset third pins 53b in which the working portions 61 are disposed at Nos. 27, 29, 31, 33, and 35. Thus, the circumferential disposition range of the welded end 632 on one side in the axial direction of the third pin 63 can be reduced.

In the embodiment, the welded ends 632 on one side in the axial direction of all the third pins 53 of the U-phase coil 421, the V-phase coil 422, and the W-phase coil 423 are disposed close to each other in the circumferential direction.

Therefore, all the bus bars 221, 222, 223, 224 are disposed within the range of 90° in the circumferential direction. This makes it easy to perform the welding process between each of the coils 421, 422, 423 and each of the bus bars 221, 222, 223, 224. Furthermore, the circumferential length of each of the bus bars 221, 222, 223, 224 can be shortened.

In addition, the pin connection portions 83 of the bus bars 221, 222, 223 of the respective phases and the neutral point connection portions 85 of the neutral point bus bars 224 are alternately disposed in the circumferential direction. In FIGS. 2 and 3, the pin connection portion 83 of the U-phase bus bar 221, the neutral point connection portion 85 connected to the U-phase coil 421, the pin connection portion 83 of the V-phase bus bar 222, the neutral point connection portion 85 connected to the V-phase coil 422, the pin connection portion 83 of the W-phase bus bar 223, the neutral point connection portion 85 connected to the W-phase coil 423, the pin connection portion 83 of the U-phase bus bar 221, the neutral point connection portion 85 connected to the U-phase coil 421, the pin connection portion 83 of the V-phase bus bar 222, the neutral point connection portion 85 connected to the V-phase coil 422, the pin connection portion 83 of the W-phase bus bar 223, and the neutral point connection portion 85 connected to the W-phase coil 423 are disposed in this order from the other side in the circumferential direction toward one side in the circumferential direction. For this reason, the intervals between the pin connection portions 83 of the bus bars 221, 222, 223 of the respective phases are the same. Accordingly, the components of the pin connection portions 83 of the U-phase bus bar 221, the V-phase bus bar 222, and the W-phase bus bar 223 can be shared.

While the exemplary embodiment of the present invention has been described above, the present invention is not limited to the embodiment described above.

In the embodiment, the second pin is disposed at the innermost stage and the third pin is disposed at the outermost stage. However, the present invention is not limited thereto. The second pin may be disposed at the outermost stage, and the third pin may be disposed at the innermost stage. Both the second pin and the third pin may be disposed at either the innermost stage or the outermost stage.

In the embodiment, the number of slots is 48, but the present invention is not limited thereto. When there are three phase inputs of the U-phase, the V-phase, and the W-phase and when each phase includes two parallel coils, the electric configuration is the same every 12 slots except for the second pin and the third pin of the irregular slot. For this reason, the number of slots may be a multiple of 12. Accordingly, for example, the number of slots may be 36 or 60. Also in this case, similarly to the embodiment, the number of teeth straddled by the two working portions included in the first pin is smaller by one than the number (reference slot number) obtained by dividing the number of teeth by the number of poles of the stator. The number of teeth straddled by the two working portions included in the second pin is larger by one than the reference slot number.

In the embodiment, each of the U-phase, the V-phase, and the W-phase includes two parallel coils. For this reason, the number of third pins is 12 including 6 third pins connected to each phase bus bar and 6 third pins connected to the neutral point bus bar. The number of bus bars is four. The four bus bars include the neutral point bus bar including six neutral point connection portions, the U-phase bus bar connected to two third pins of the U-phase coil, the V-phase bus bar connected to two third pins of the V-phase coil, and the W-phase bus bar connected to two third pins of the coil.

However, the present invention is not limited thereto. Each of the U-phase, the V-phase, and the W-phase may be configured by a group of pins connected in series. Each of the U-phase, the V-phase, and the W-phase may have at least three parallel coils. For example, when each phase of the U-phase, the V-phase, and the W-phase does not include the parallel coil, the number of third pins is six including three third pins connected to each of the three phase bus bars and three third pins connected to the neutral point bus bar. On the other hand, the number of bus bars is four similarly to the embodiment. The four bus bars include the neutral point bus bar including three neutral point connection portions, the U-phase bus bar connected to one third pin of the U-phase coil, the V-phase bus bar connected to one third pin of the V-phase coil, and the W-phase bus bar connected to one third pin of the W-phase coil.

In the embodiment, the number of phases of the input power is three. However, the number of phases of the input power is not limited to three phases, but may be at least four phases. In addition, the number of slots through which in-phase currents flow continuously may be at least three.

In the embodiment, the number of stages formed in one slot is six, but the present invention is not limited thereto. The number of stages formed in one slot may be four or at least eight. Even in this case, the second pin and the third pin are disposed in a part of either the outermost step or the innermost step, and the first pin is disposed in the other steps and places.

With regard to the detailed shapes of the stator and the motor, the shapes may be different from those illustrated in the drawings of this application. Also note that features of the above-described embodiment and the modifications thereof may be combined appropriately as long as no conflict arises.

The present invention can be used in a stator and a motor.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A stator used in a motor, the stator comprising:
a stator core including an annular core back centered on a center axis and a plurality of teeth extending from the core back toward a radial inside;
a plurality of pins including a conductive working portion extending in an axial direction in a slot between the teeth; and
a plurality of bus bars electrically connected to the plurality of pins,
wherein in each of the slots, the working portions are disposed over a plurality of stages in a radial direction,
the plurality of pins include
a first pin including the two working portions disposed across the teeth,
a second pin including the two working portions disposed across the teeth, and
a third pin that includes the one working portion and is connected to the bus bar,
each of the first pin and the second pin includes
a crossing portion connecting the two working portions in a circumferential direction on one side in the axial direction, and
a connection portion connected to another pin on the other side in the axial direction of the working portion,
in the first pin, the two working portions are inserted into an identical stage or stages adjacent to each other in the radial direction,
each of the working portions of the second pin is disposed in one of an outermost stage and an innermost stage of the slot,
each of the working portions of the third pin is disposed in one or the other of the outermost stage and the innermost stage of the slot, and
a number of the teeth straddled by the second pin is larger by two than a number of the teeth straddled by the first pin.

2. The stator according to claim 1, wherein
the number of the teeth straddled by the two working portions included in the first pin is smaller by one than the number obtained by dividing the number of the teeth by the number of poles of the stator, and the number of the teeth straddled by the two working portions included in the second pin is larger by one than the number obtained by dividing the number of the teeth by the number of the poles of the stator.

3. The stator according to claim 1, wherein
the number of the bus bars is four,
the number of the third pins is six, and
the bus bar includes
a neutral point bus bar connected to the three third pins,
a U-phase bus bar connected to the one third pin,
a V-phase bus bar connected to the one third pin, and
a W-phase bus bar connected to the one third pin.

4. The stator according to claim 1, wherein
the number of the bus bars is four,
the number of the third pins is 12,
the bus bar includes
a neutral point bus bar connected to the six third pins,
a U-phase bus bar connected to the two third pins,
a V-phase bus bar connected to the two third pins, and
a W-phase bus bar connected to the two third pins.

5. The stator according to claim 3, wherein
a plurality of the slots of the stator core include
a single-phase slot in which only one type of the working portion electrically connected to the U-phase bus bar, the working portion electrically connected to the V-phase bus bar, and the working portion electrically connected to the W-phase bus bar is disposed, and
a multi-phase slot in which any two types of the working portion electrically connected to the U-phase bus bar, the working portion electrically connected to the V-phase bus bar, and the working portion electrically connected to the W-phase bus bar are disposed, and
the single-phase slot and the multi-phase slot are alternately disposed in a circumferential direction.

6. The stator according to claim 3, wherein
the third pin connected to the neutral point bus bar includes
a neutral point bus bar connection portion connected to the neutral point bus bar on one side in the circumferential direction of the working portion, and
a first inclination portion connecting the neutral point bus bar connection portion and the working portion,
the third pin connected to any one of the U-phase bus bar, the V-phase bus bar, and the W-phase bus bar includes
a phase bus bar connection portion connecting the working portion and any one of the U-phase bus bar, the V-phase bus bar, and the W-phase bus bar on the other circumferential direction side of the working portion, and
a second inclination portion connecting the phase bus bar connection portion and the working portion, and
at least a part of a plurality of the first inclination portions intersects at least a part of a plurality of the second inclination portions.

7. The stator according to claim 3, wherein
the neutral point bus bar includes a neutral point connection portion electrically connected to the third pin,
each of the U-phase bus bar, the V-phase bus bar, and the W-phase bus bar includes a pin connection portion electrically connected to the third pin, and
the neutral point connection portion and the pin connection portion are alternately disposed in the circumferential direction.

8. The stator according to claim 1, wherein
each of the third pins includes
a first connection portion electrically connected to the bus bar on the one side in the axial direction of the working portion, and
a second connection portion welded to another pin on the other side in the axial direction of the working portion.

9. The stator according to claim 3, wherein
each of the U-phase bus bar, the V-phase bus bar, and the W-phase bus bar includes
a power supply connection portion extending in the radial direction, one end of the power supply connection portion being directly or indirectly connected to a power supply device,
an arcuate portion that is connected to the other end of the power supply connection portion and extends in the circumferential direction, and
a pin connection portion electrically connected to the third pin, one end of the pin connection portion being connected to the arcuate portion.

10. The stator according to claim 1, wherein
the plurality of bus bars are disposed within a range of 90° in the circumferential direction.

11. A motor comprising:
the stator according to claim 1; and
a rotor that is disposed on the radial inside of the stator core and supported so as to be rotatably about the center axis.

* * * * *